United States Patent [19]  
Colburn et al.

[11] 3,920,170  
[45] Nov. 18, 1975

[54] APPARATUS FOR MAKING CYLINDRICAL SCREENS
[75] Inventors: Edward N. Colburn; Reinhold S. Markfelt, both of Minneapolis, Minn.
[73] Assignee: Universal Oil Products Company, Des Plaines, Ill.
[22] Filed: Oct. 24, 1974
[21] Appl. No.: 517,560

Related U.S. Application Data
[62] Division of Ser. No. 344,460, March 23, 1973, Pat. No. 3,875,977.

[52] U.S. Cl. .......... 228/5.1; 29/163.5 CW; 140/112; 219/56
[51] Int. Cl.² ................ B23K 31/00; B23K 11/06; B21F 15/08
[58] Field of Search .......... 219/56, 57, 58; 140/112; 29/163.5 CW; 228/5

[56] References Cited
UNITED STATES PATENTS
2,046,457  7/1936  Johnson .................... 140/112 X
3,280,855  10/1966  Magers, Jr. ................ 140/112
3,785,409  1/1974  Smith, III .................. 140/112 X Primary Examiner—Al Lawrence Smith
Assistant Examiner—K. J. Ramsey
Attorney, Agent, or Firm—James R. Hoatson, Jr.; Barry L. Clark; William H. Page, II

[57] ABSTRACT

Wound well screens and industrial filter screens are made with circular rather than polygonal cross-sections by preforming the wrapping wire with powered bending rollers, feeding it while curved and without tension into tangential contact with a plurality of spaced, circularly arranged, longitudinally extending screen rods, and welding the wire to the rods at each point of contact. Synchronization of the speed of rotation of a welding mandrel carrying the plurality of rods and of the feed of the wrapping wire is accomplished by causing the wire to assume the shape of a plurality of helical, loosely coiled turns about the periphery of the rods between the point of bending and the point of welding and varying the feed of the wire as necessary.

2 Claims, 3 Drawing Figures

APPARATUS FOR MAKING CYLINDRICAL SCREENS

This is a division of application Ser. No. 344,460, filed Mar. 23, 1973, now U.S. Pat. No. 3,875,977.

BACKGROUND OF THE INVENTION

Well screens and industrial filter screen cylinders are conventionally made by helically wrapping an elongated wire about a plurality of spaced, cylindrically arranged, longitudinally extending screen rods, with the wire being welded to each rod as it is wound into contact with it. The size of the slot openings between adjacent wraps of wire is determined by the winding pitch and the width of the wire. It is also conventional for the wire being wound to pass through a set of straightening rollers which are rotated by the pulling of the wire through them. The friction produced between the straightening rollers and the wire causes a considerable tension to exist in the wire between the rollers and the screen cylinder being wound. This tension, together with the softening of the wire that takes place at each point where it is welded to the rods, causes the wire to assume a polygonal shape, as shown in U.S. Pat. No. 2,046,458 to E. E. Johnson.

There are many reasons why it would be more desirable to have a circular cross-section rather than a polygonal one. These include improved appearance, greater resistance to external pressure, more uniform slot openings, more uniform welding, and in the case of screens intended to become industrial screen panels, better flattening characteristics. Attempts have been made to achieve screen cylinder roundness by pre-bending the wrapping wire as it is fed into the fabricating machine. For example, the non-driven straightening rollers of prior art devices have been replaced by non-driven bending rollers. However, the polygonal shape seems to result even when the wire is passed through such bending rollers since there must always be a space between the bending rollers and the point of welding and the wire tends to straighten out in this space.

SUMMARY

It is an object of this invention to provide a method and apparatus for forming a cylindrical well screen or filter screen with a circular cross-section. This object can be accomplished by modifying existing screen forming equipment so as to include powered bending rollers. The powered bending rollers can feed the wire in a tension free manner so that the softening of the wire which takes place during welding will not result in straightening of the wire.

Although it would be preferable to feed the curved wire directly from the powered preformer station to the welding station, such a positioning of the preformer station is generally impractical since space limitations prevent the bending rollers from being positioned as close to the welding station as would be required to prevent the wire from losing its bent shape. Furthermore, slippage betwen the bending rollers and the wire would prevent the bending rollers from being driven in direct synchronization with the drive of the welding mandrel. Although it will be obvious to those skilled in the art that control devices capable of synchronizing the drive of the welding mandrel to the drive of the bending rollers are commercially available, such control devices would be relatively expensive as compared to the synchronizing means of the present invention which comprises loosely helically winding six or more wraps of wire around the longitudinal screen rods. The coil formed by the helically wound wire permits the bending rollers to be positioned at a location which is axially remote from the welding station. By making the coil loose, such that it has a diameter about 1 inch greater than the screen cylinder, it is quite simple to manually adjust a variable speed drive for the bending rollers so that the diameter of the coil of wire will maintain a relatively constant diameter. As the coil diameter lessens, the drive may be speeded up, and as it increases, the drive may be slowed down. Obviously, the sensing of the change in coil size could also be determined mechanically, optically or electrically with appropriate signals being automatically impressed upon the roller drive to change its speed.

DESCRIPTION OF THE PREFERRED EMBODIMENT

Figure 1:
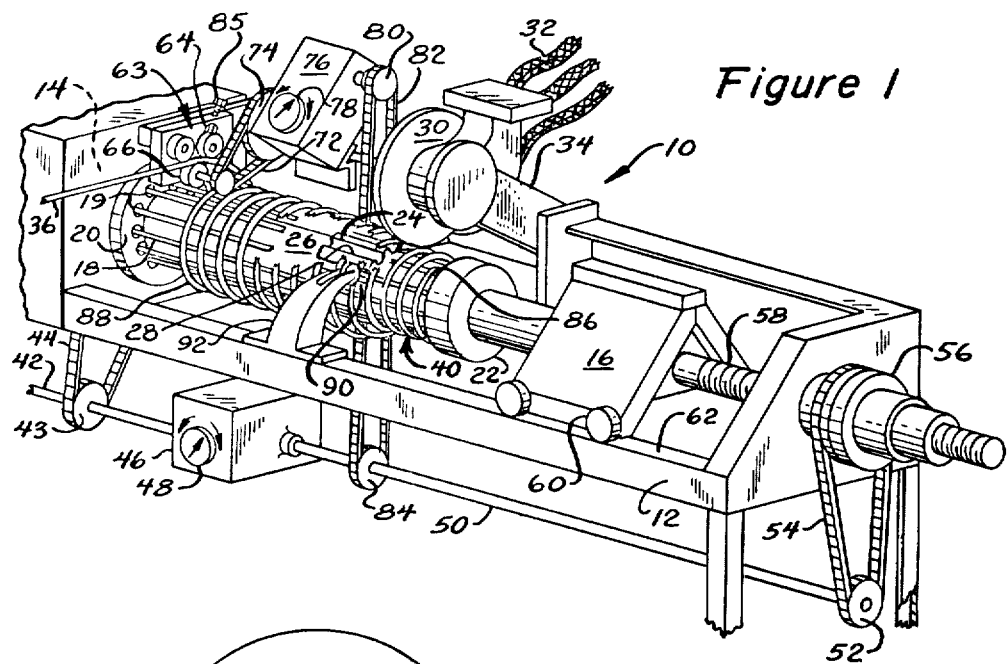
FIG. 1 is a fragmentary front perspective view of a screen-making machine incorporating the invention.

Referring to FIG. 1, an apparatus for making cylindrical screens is indicated generally at 10. The apparatus includes a frame 12 having a rod supply chamber 14 positioned at one end thereof. A rod pulling carriage 16 is mounted on the frame for axial movement toward and away from the rod supply chamber 14. A plurality of elongated screen rods 18 extend outwardly from rod supply chamber 14 through holes 19 in a rotating guide plate 20 mounted thereon. The outer ends of the rods 18 are locked in circumferentially spaced relation to each other in carriage pulling head 22 which is mounted for rotation in carriage 16 and axially movable therewith. A mandrel or weld head 24 has a reduced diameter portion 26 which is fixed for rotation with guide plate 20. A plurality of circumferentially spaced rod receiving slots 28 in the peripheral surface of weld head 24 accommodates the screen rods 18 and supports the rods as they are welded. A weld roller 30, which receives welding current through power leads 32, is mounted on a pivoted weld roller support arm 34 attached to the frame 12 of the apparatus. The weld roller 30 is biased downwardly into engagement with a screen wire 36 which is to be welded to successive screen rods 18 as the weld head 24 is rotated. Welding current passes through lead wires 32, the weld roller 30, screen wire 36, rods 18, weld head 24 and back to its source through mandrel power leads (not shown).

As the screen wire 36 is helically wrapped around the screen rods 18 a screen cylinder indicated generally at 40 is formed. Although FIG. 1 shows successive convolutions of the wire 36 spaced apart at a substantial distance, in practice, the wire spacing is usually quite small, depending upon the use to which the screen is to be put. Obviously, the wire spacing would be much smaller when the screen is to be used as a well screen than would be the case when the screen is split along its length and flattened to form a sorting screen for large particles.

In operation, the drive shaft 42 is driven by a motor (not shown) to cause gear 43 on the drive shaft to drive a weld head drive chain 44 which rotates a mandrel or weld head 24. A splined shaft (not shown) is also driven by the drive shaft 42 and carries a gear which causes the carriage pulling head 22 to rotate in exact synchronism with the weld head 24. The drive shaft 42 is connected to a speed change device 46 which has an adjustable speed dial 48 for varying the speed of output shaft 50 attached to the speed change device. At the outer end of output shaft 50 is a gear 52 which is in engagement with a gear chain 54 which rotates the carriage drive feed nut assembly 56. The feed nut assembly 56 causes axial movement of the non-rotating lead screw 58 attached to the carriage 16. The carriage 16 moves axially on rollers 60 which engage a guide rail 62 formed as part of the frame 12.

The screen wire 36 which is helically wrapped around the rods 18 and welded to them to form the screen cylinder 40 is supplied to the machine 10 from a coil (not shown). After the wire leaves the coil it passes through a set of straightening rollers (not shown) and then through a preformer or bending roller assembly indicated generally at 63. The bending roller assembly 63 includes a bending roller support plate 64 attached to the rod supply chamber 14. The roller support plate 64 rotatably mounts a driven roller 66, a non-driven roller 68 and an adjustable non-driven roller 70. A drive chain 72 drives the driven roller 66 by means of drive gear 74 carried by speed adjustment box 76 having a speed adjustment dial 78. The input power to the speed adjustment box 76 is provided by input gear 80 which is driven by drive chain 82 attached to driven shaft 50 by means of gear 84.

To operate the apparatus 10 to form a screen cylinder 40 a plurality of elongated rods 18 are threaded from the right through the holes 19 in the rotating guide plate 20 so that the major portion of their length is contained within rod supply chamber 14. The right ends of the rods 18 are secured to the carriage pulling head 22 by fastening means (not shown). The wrapping wire 36 is then lead from its coil (not shown) through a set of straightening rollers (not shown) and into the preforming or bending rollers 66, 68, 70. The machine is then started so as to cause the preforming rollers 66, 68, 70 to begin to form a spiral coil 88 of wrapping wire 36. The preforming roller 70 is adjusted, by adjustment screw 85, to yield a coil of wire 88 which is just slightly greater in diameter than the array of longitudinal rods 18. When six or eight turns of wire of the desired coil diameter have been formed, the end 86 of the wire 36 is placed under the final wire guide roller 90 which is positioned as close as possible to the point at which welding will take place. The weld roller 30 is then lowered so as to rest on the end 86 of the wire after which the weld circuit is energized momentarily to secure the wire 36 to one of the longitudinal rods 18. The machine 10, including the weld circuit, is then started up and begins to fabricate a screen 40. As the screen 40 is being formed, the preformer speed adjustment dial 78 is regulated either manually or automatically so that the coil 88 of wrapping wire 36 preceding the weld point neither tightens on the bundle of rods nor becomes excessively large in diameter or number of turns. Thus, the speed of the preformer or bending roller assembly 63 is synchronized with that of the screen machine 10, which machine may be adjusted from time to time with the adjustment dial 48 according to the particular screen size and members being fabricated. Since the preformer 63 is driven from the shaft 50 it will be obvious that further adjustments of machine speed by adjustment dial 48 will automatically bring about a corresponding change in preformer speed.

Figure 2:
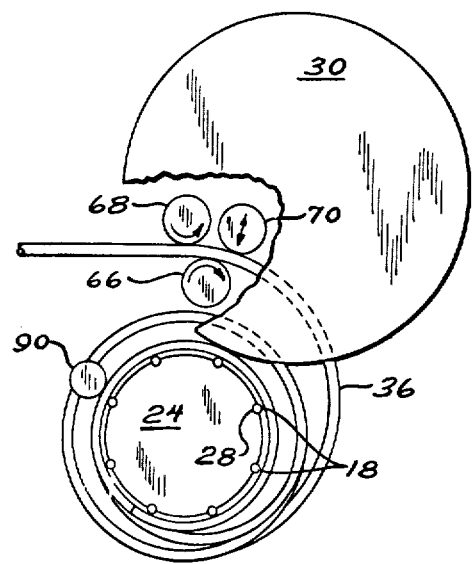
FIG. 2 is a fragmentary end view, partially in section, showing a portion of the structure of FIG. 1.

In FIG. 2, the relationship between the mandrel 24, wire 36, bending rollers 66,68,70, guide roller 90, and weld roller 30 is shown on an enlarged scale.

Figure 3:
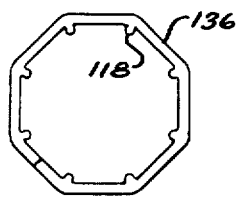
FIG. 3 is an end view of a prior art well screen.

FIG. 3 shows an end view of a prior art screen in which the screen wire 136 assumes a polygonal crosssection. The shape is a result of the wire bending at each rod location 118 due to the heat of welding and the tension produced in the wire as it is pulled through straightening rollers (not shown).

We claim as our invention:

1. In a cylindrical welded screen making apparatus of the type having a rotating weld head, a welding roller, and a carriage for rotating and longitudinally advancing a plurality of rods as a wire is helically wrapped around them and welded to them, the improvement comprising a set of preforming rollers for feeding said wire, said preforming rollers being positioned close to said rods but axially spaced from said welding roller so that said wire is loosely coiled through at least one revolution about said rods between said preforming rollers and said welding rollers, at least one of said preforming rollers being powered, and means for adjusting the rate of feed of said wire by said preforming rollers so that the size of the coil of wire can be maintained at approximately a predetermined size.

2. The apparatus of claim 1 and further including a guide roller positioned immediately adjacent said welding roller for guiding said wire just before it is welded.

* * * * *